(12) United States Patent
Yun et al.

(10) Patent No.: US 12,341,584 B2
(45) Date of Patent: Jun. 24, 2025

(54) DYNAMIC BEAMFORMING IN A CELLULAR NETWORK

(71) Applicant: DISH Wireless L.L.C., Littleton, CO (US)

(72) Inventors: Sang Boh Yun, Ashburn, VA (US); Siddhartha Chenumolu, Ashburn, VA (US); Premchand Chandran, Ashburn, VA (US); Dilip Tandekar, Broadlands, VA (US); Dhaval Mehta, Aldie, VA (US); Gurpreet Sohi, Parker, CO (US)

(73) Assignee: DISH Wireless L.L.C., Littleton, CO (US)

( * ) Notice: Subject to any disclaimer, the term of this patent is extended or adjusted under 35 U.S.C. 154(b) by 307 days.

(21) Appl. No.: 17/704,865

(22) Filed: Mar. 25, 2022

(65) Prior Publication Data

US 2023/0308149 A1   Sep. 28, 2023

(51) Int. Cl.
   *H04B 7/06*   (2006.01)
   *H04W 72/044*   (2023.01)

(52) U.S. Cl.
   CPC ........ *H04B 7/0617* (2013.01); *H04W 72/046* (2013.01)

(58) Field of Classification Search
   None
   See application file for complete search history.

(56) References Cited

U.S. PATENT DOCUMENTS

| | | | | |
|---|---|---|---|---|
| 5,678,174 | A * | 10/1997 | Tayloe | H04B 7/18539 |
| | | | | 455/13.1 |
| 9,214,981 | B1 * | 12/2015 | Park | H04B 7/0413 |
| 2003/0017853 | A1 * | 1/2003 | Kanamaluru | H04W 16/28 |
| | | | | 455/562.1 |
| 2003/0114195 | A1 * | 6/2003 | Chitrapu | H04W 36/322 |
| | | | | 455/562.1 |
| 2013/0090126 | A1 * | 4/2013 | Xing | H04B 7/0617 |
| | | | | 455/452.1 |
| 2018/0115958 | A1 * | 4/2018 | Raghavan | H04W 72/046 |
| 2019/0097701 | A1 * | 3/2019 | Kim | H04L 5/0048 |
| 2019/0260485 | A1 * | 8/2019 | Byun | H04W 4/40 |

(Continued)

FOREIGN PATENT DOCUMENTS

EP   3 965 438 A1   3/2022

OTHER PUBLICATIONS

International Search Report and Written Opinion for PCT/US2023/016002 mailed Jun. 23, 2023, all pages.

*Primary Examiner* — Lonnie V Sweet
(74) *Attorney, Agent, or Firm* — Kilpatrick Townsend & Stockton LLP

(57) ABSTRACT

Systems, methods, and machine-readable media facilitate adaptive beamforming in a cellular network. One or more signals indicative of one or more locations of a first set of one or more radio units and/or a first set of user equipment may be processed. A first set of beamforming specifications may be determined based at least in part on the one or more locations of the first set of one or more radio units and/or the first set of user equipment. The first set of beamforming specifications may correspond to a first set of one or more beamforming patterns. The first set of beamforming specifications may be communicated to instruct the first set of one or more radio units to direct signal transmission in conformance with the first set of one or more beamforming patterns.

20 Claims, 7 Drawing Sheets

(56) References Cited

U.S. PATENT DOCUMENTS

| | | | |
|---|---|---|---|
| 2021/0036752 A1* | 2/2021 | Tofighbakhsh | H04B 7/0695 |
| 2021/0211912 A1* | 7/2021 | Zeng | H04L 5/1461 |
| 2022/0014244 A1* | 1/2022 | Österling | H04B 7/0617 |
| 2022/0190883 A1* | 6/2022 | Kaya | H04W 36/085 |

\* cited by examiner

DYNAMIC BEAMFORMING IN A CELLULAR NETWORK

TECHNICAL FIELD

This disclosure generally relates to wireless networks, and more particularly to systems and methods for dynamic beamforming in a cellular network.

BACKGROUND

Maximizing performance and minimizing interference are ever-increasing concerns that extend to highly complex cellular networks including, for example, in 5G and future deployments, that involve many different macrocells, microcells, small cells, femtocells, and other types of cells, communicating with many different instances of user equipment. Providing sufficient signal strength for the different instances of user equipment may be a priority for carriers, yet, with the proliferation of cellular network components, crowding and interference become more difficult to address at the same time. Conventional control of cellular network components tends to be static, not optimal, and relegated to individual cells, failing to address these concerns. Moreover, conventional technologies are deficient in addressing the rapidly changing components of cellular networks.

Thus, there is a need for systems and methods that address the foregoing problems. This and other needs are addressed by the present disclosure.

BRIEF SUMMARY

Certain embodiments disclosed in the present disclosure relates to wireless networks, and more particularly to systems and methods for dynamic beamforming in a cellular network.

In one aspect, a system to facilitate adaptive beamforming in a cellular network is disclosed. The system may include one or more processing devices and memory communicatively coupled with, and readable by the one or more processing devices, and having stored therein machine-readable instructions which, when executed by the one or more processing devices, cause the one or more processing devices to perform operations. The operations may include one or a combination of the following. One or more signals indicative of one or more locations of a first set of one or more radio units and/or a first set of user equipment may be processed. A first set of beamforming specifications may be determined based at least in part on the one or more locations of the first set of one or more radio units and/or the first set of user equipment. The first set of beamforming specifications may correspond to a first set of one or more beamforming patterns. The first set of beamforming specifications may be communicated to instruct the first set of one or more radio units to direct signal transmission in conformance with the first set of one or more beamforming patterns.

In another aspect, a method to facilitate adaptive beamforming in a cellular network is disclosed. The method may include one or a combination of the following, one or a combination of which may be performed by a beamforming control system. One or more signals indicative of one or more locations of a first set of one or more radio units and/or a first set of user equipment may be processed. A first set of beamforming specifications may be determined based at least in part on the one or more locations of the first set of one or more radio units and/or the first set of user equipment. The first set of beamforming specifications may correspond to a first set of one or more beamforming patterns. The first set of beamforming specifications may be communicated to instruct the first set of one or more radio units to direct signal transmission in conformance with the first set of one or more beamforming patterns.

In yet another aspect, one or more non-transitory, machine-readable media having machine-readable instructions thereon which, when executed by one or more processing devices, cause the one or more processing devices to perform operations are disclosed. The operations may include one or a combination of the following. One or more signals indicative of one or more locations of a first set of one or more radio units and/or a first set of user equipment may be processed. A first set of beamforming specifications may be determined based at least in part on the one or more locations of the first set of one or more radio units and/or the first set of user equipment. The first set of beamforming specifications may correspond to a first set of one or more beamforming patterns. The first set of beamforming specifications may be communicated to instruct the first set of one or more radio units to direct signal transmission in conformance with the first set of one or more beamforming patterns.

In various embodiments, a second set of one or more radio units and/or a second set of user equipment that potentially or actually cause interference with respect to the first set of one or more radio units and/or the first set of user equipment may be identified. The determining the first set of beamforming specifications may be based at least in part on the second set of one or more radio units and/or the second set of user equipment. In various embodiments, one or more signals indicative of network state corresponding to the first set of one or more radio units and/or the first set of user equipment may be received. A second set of beamforming specifications may be generated based at least in part on the one or more signals indicative of network state. The second set of beamforming specifications may correspond to a second set of one or more beamforming patterns that is different from the first set of one or more beamforming patterns. The second set of beamforming specifications may be communicated to instruct the first set of one or more radio units to direct signal transmission in conformance with the second set of one or more beamforming patterns.

In various embodiments, a third set of beamforming specifications may be generated based at least in part on the one or more signals indicative of network state. The third set of beamforming specifications may correspond to a third set of one or more beamforming patterns that is different from the first set of one or more beamforming patterns and the second set of one or more beamforming patterns. The third set of beamforming specifications may be communicated to instruct the second set of one or more radio units to direct signal transmission in conformance with the third set of one or more beamforming patterns.

In various embodiments, the one or more signals indicative of network state may indicate interference with respect to the first set of user equipment and/or the second set of user equipment. In various embodiments, one or more radio access network intelligent controllers may be used to control the first set of one or more radio units to transition from operating in conformance with the first set of one or more beamforming patterns to operating in conformance with the second set of one or more beamforming patterns. In various embodiments, one or more radio access network intelligent controllers may be used to control the second set of one or more radio units to transition from operating in conformance with the third set of one or more beamforming patterns to operating in conformance with a fourth set of one or more beamforming patterns.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skills in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
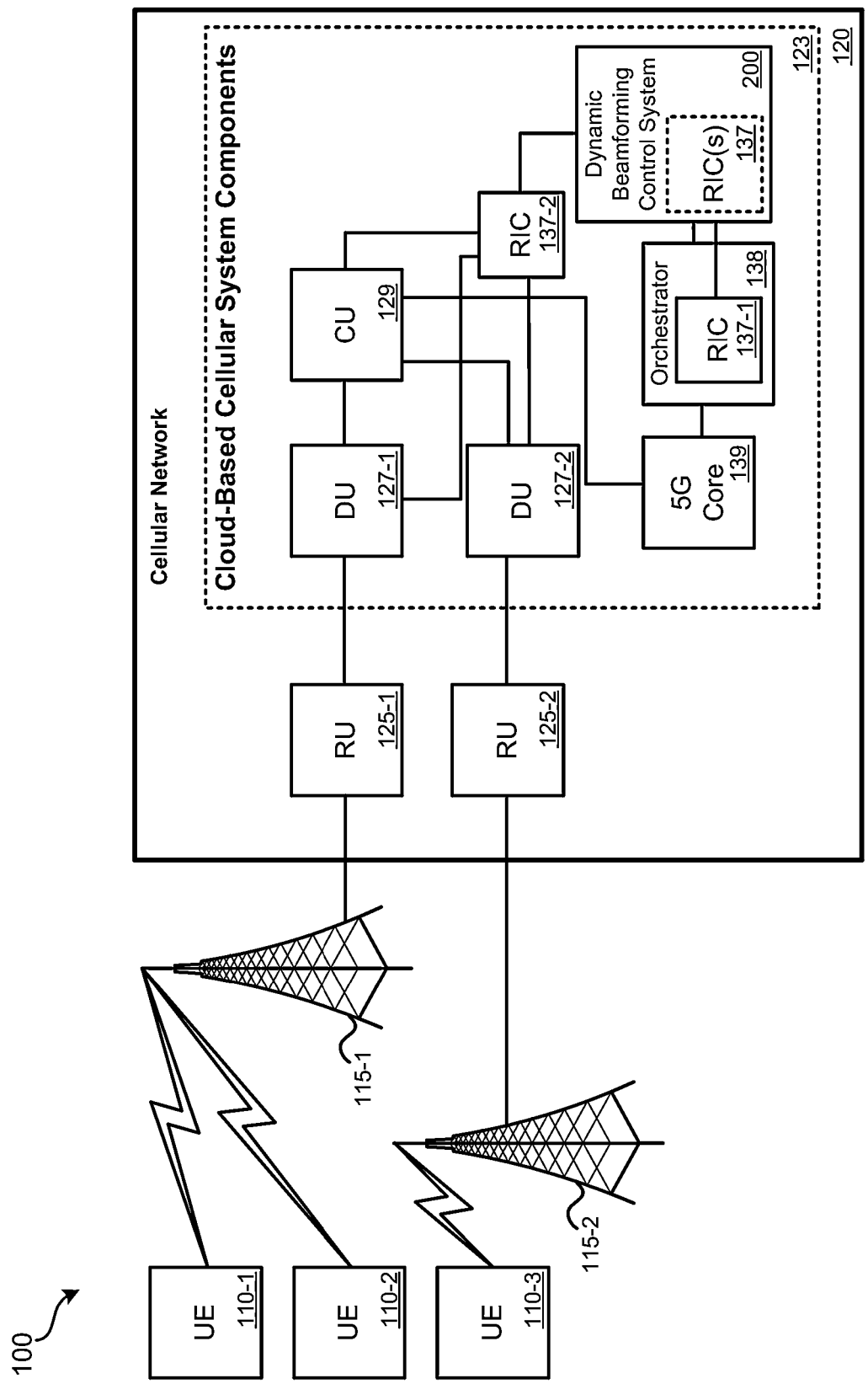
FIG. 1 illustrates an embodiment of a cellular network system, in accordance with some example embodiments according to the present disclosure.

FIG. 1 illustrates an embodiment of a cellular network system 100 ("system 100"), in accordance with some example embodiments according to the present disclosure. System 100 may include a 5G New Radio (NR) cellular network; other types of cellular networks are also possible. System 100 may include: user equipment 110 (UE 110, UE 110-1, UE 110-2, UE 110-3); base station 115; cellular network 120 infrastructure including hardware, software, switches, routers, etc.; radio units 125 ("RUs 125"); distributed units 127 ("DUs 127"); centralized unit 129 ("CU 129"); 5G core 139, and orchestrator 138. FIG. 1 represents a component-level view. In a virtualized and cloud-based network, because components may be implemented as software in the cloud, except for components that need to receive and transmit RF, the functionality of the various components may be shifted among different servers to accommodate where the functionality of such components is needed.

UE 110 may represent various types of end-user devices, such as smartphones, cellular modems, cellular-enabled computerized devices, sensor devices, gaming devices, access points (APs), any computerized device capable of communicating via a cellular network, etc. Depending on the location of individual UEs, UE 110 may use RF to communicate with various base stations of cellular network 120. As illustrated, two base stations 115 (BS 115-1, 115-2) are illustrated. In various general examples, an RU may be attached on a tower or under a tower. Real-world implementations of system 100 may include many (e.g., thousands) of base stations, RUs, DUs, and CUs. In various examples, a DU/CU can be either public cloud or cell site or proprietary LDC. BS 115 may include one or more antennas that allow RUs 125 to communicate wirelessly with UEs 110. RUs 125 may represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture.

One or more RUs, such as RU 125-1, may communicate with DU 127-1. One or more DUs, such as DU 127-1, may communicate with CU 129. CU 129 may communicate with 5G core 139. The specific architecture of cellular network 120 may vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

5G core 139, which may be physically distributed across data centers or located at a central national data center (NDC), may perform various core functions of the network. 5G core 139 may include: authentication server function (AUSF); core access and mobility management function (AMF); data network (DN) which may provide access to various other networks; structured data storage network function (SDSF); and unstructured data storage network function (UDSF). While FIG. 1 illustrates various components of NDC and cellular network 120, it should be understood that other embodiments of cellular network 120 may vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components may be co-located or located at disparate physical server systems. For example, certain components of 5G core 139 may be co-located with components of CU 129.

In a possible O-RAN implementation, DUs 127, CU 129, 5G core 139, and orchestrator 138 may be implemented as software being executed by general-purpose computing equipment, such as in a data center. Therefore, depending on needs, the functionality of a DU, CU, and/or 5G core may be implemented locally to each other and/or specific functions of any given component may be performed by physically separated server systems (e.g., at different server farms). For example, some functions of a CU may be located at a same server facility as where the DU is executed, while other functions are executed at a separate server system.

Kubernetes, or some other container orchestration platform, may be used to create and destroy the logical DU, CU, 5G core units and subunits as needed for the cellular network 120 to function properly. Kubernetes may allow for container deployment, scaling, and management. As an example, if cellular traffic increases substantially in a region, an additional logical DU or components of a DU may be deployed in a data center near where the traffic is occurring without any new hardware being deployed. Rather, processing and storage capabilities of the data center would be devoted to the needed functions. When the need for the logical DU or subcomponents of the DU is no longer needed, Kubernetes may allow for removal of the logical DU.

The deployment, scaling, and management of such virtualized components may be managed by orchestrator 138. Orchestrator 138 may represent various software processes executed by underlying computer hardware. Orchestrator 138 may monitor cellular network 120 and determine the amount and location at which cellular network functions should be deployed to meet or attempt to meet service level agreements (SLAs) across slices of the cellular network.

Various embodiments may provide network slices, network services, or both. The network services provided may include VNFs (virtualized network functions), PNFs (physical network functions), and/or other network services. The VNFs may include software-based functions that may be utilized in conjunction with one or more slices such as security functions, monitoring functions, and/or the like. The PNFs may include hardware components of the cellular network which the dynamic beamforming control system 200, which may include orchestrator 138, may configure to provide a network slice and/or other network services to a particular client.

The network 120 components such as DUs 127, CU 129, orchestrator 138, and 5G core 139 may include various software components that are required to communicate with each other, handle large volumes of data traffic, and be able to properly respond to changes in the network. In order to ensure not only the functionality and interoperability of such components, but also the ability to respond to changing network conditions and the ability to meet or perform above vendor specifications, significant testing must be performed.

The cellular network 120 may include a dynamic beamforming control system 200 (which may also be referenced herein as control system 200 or system 200). In various embodiments, the dynamic beamforming control system 200 may correspond to one or a combination of one or more portions or all of the cellular network 120, one or more portions or all of the cloud-based cellular system components 123, and/or one or more portions or all of the orchestrator 138. In some embodiments, the dynamic beamforming control system 200 may include the orchestrator 138.

The cellular network 120 may include one or more radio access network intelligent controllers (RICs) 137. The system 200 may, in various embodiments, include one or more of the RICs 137 or may be otherwise communicatively coupled with the RICs 137. The system 200 may be configured to control and use the RICs 137 to facilitate various dynamic beamforming features disclosed herein. The RICs 137 may include a non-real-time MC 137-1, which may be included in the orchestrator 138 in some embodiments. The non-real-time MC 137-1 may be configured with one or more logical functions that facilitate control of the components and resources of the network 120 components, such as DUs 127, CU 129, and RUs 125, as well as facilitating learning and modeling features of the system 200. Additionally or alternatively, the RICs 137 may include a real-time and/or near-real-time RIC 137-2. The RIC 137-2 may be configured with one or more logical functions that facilitate real-time and/or near-real-time control of the components and resources of the network 120 components.

Figure 2:
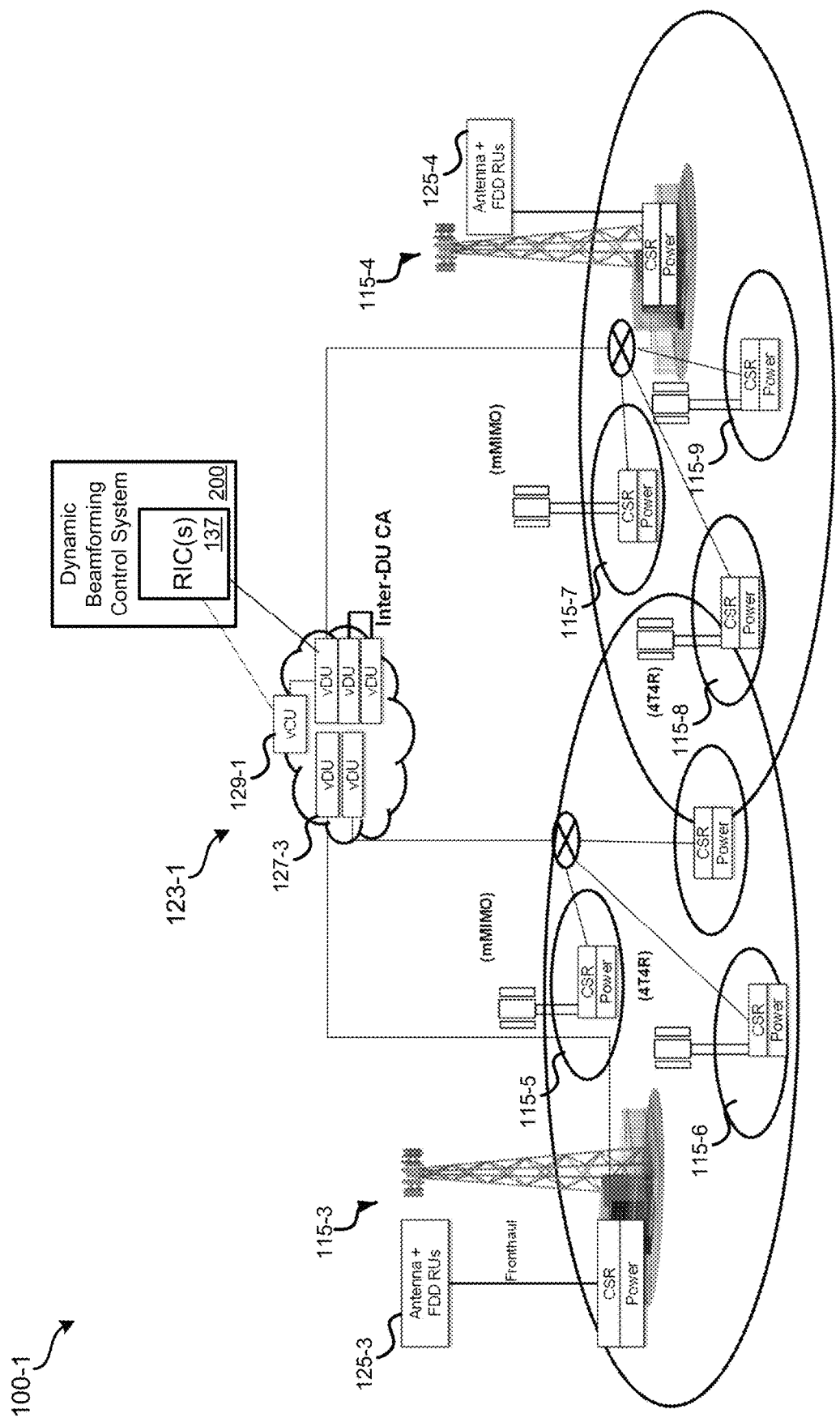
FIG. 2 illustrates an example network architecture of the cellular network system, in accordance with some example embodiments according to the present disclosure.

FIG. 2 illustrates an example network architecture of the cellular network system 100, in accordance with some example embodiments according to the present disclosure. As indicated, the dynamic beamforming control system 200 may include or otherwise be communicatively coupled to the RICs 137 and may utilize the RICs 137 to communicate with them control other network 120 components. The virtualized and cloud-based cellular system components 123 may include one or more CUs 129 and DUs 127, which may be, for example, co-located at a local data center. Additionally or alternatively, one or more DUs 127 may be located at a cell site. The DUs 127 may correspond to virtual DUs in some embodiments. The DUs 127 may support frequency division duplexing (FDD) and time-division duplexing (TDD). In some embodiments, one or more TDD RU fronthauls may be communicatively coupled to the local data center. It is to be noted that, while FDD RUs may be used in some examples herein, those examples are non-limiting. In various embodiments, RUs may be FDD or TDD, for example.

The system 100 may include a plurality, indeed many, cells 115. At least some of the cells 115 may correspond to base stations. The cells 115 may be of varying types, including macrocells, medium-sized cells, microcells, and/or other cells. For example, as illustrated, cells 115-3 and 115-4 may correspond to macrocells, Other cells 115, such as cell 115-5, may correspond to medium-sized cells. It is to be noted that, while CBRS may be used in some examples herein, those examples are non-limiting. Various embodiments may be implemented with any suitable frequency band.

Figure 3:
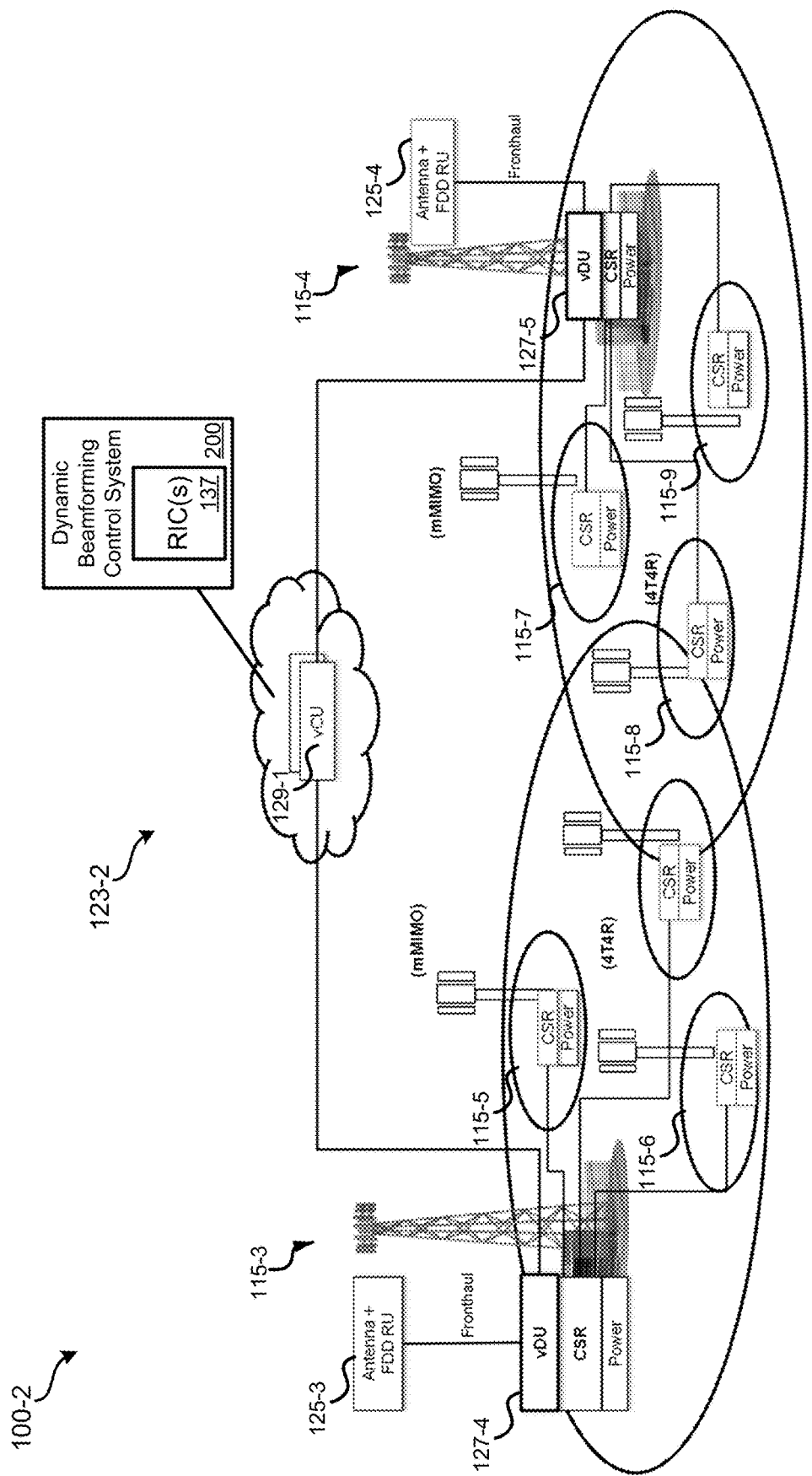
FIG. 3 illustrates another example network architecture of the cellular network system, in accordance with some example embodiments according to the present disclosure.

FIG. 3 illustrates another example network architecture of the cellular network system 100, in accordance with some example embodiments according to the present disclosure. As in the example depicted, some embodiments of the system 100 may include the DUs 127 at the cell sites 115. Accordingly, the cell site 115 DUs 127 may support FDD and TDD. One or more TDD RU fronthauls may be communicatively coupled to CSRs at the cell sites 115. The cloud-based cellular system components 123 may include one or more CUs 129. The system 200 and the RIC(s) 127 may likewise still be cloud-based.

With either architecture, disclosed embodiments of the dynamic beamforming control system 200 may provide for adaptive beamforming control of the plurality of cells 115. Thus, rather than taking into account only one cell 115 at a time and the UE 110 serviced by just that one cell 115, the system 200 may control beamforming as a function of a plurality of cells 115 and the UE 110 serviced by each cell 115 of the plurality of cells 115. The system 200 may use RIC(s) 137 connected to a plurality of DUs 127 to dynamically change the beamforming patterns of the RUs 125 connected to the DUs 127. Using the RIC(s) 137, the system 200 may control the beamforming of each cell 115 of the plurality of cells 115, where the control is a function of at least subsets of the cells 115 that are in mutual proximity such that the system 200 determines that there could be potential interference between the mutually proximate cells 115. For example, the system 200 may determine that adjacent cells 115-3, 115-5, and 115-6 are mutually proximate such that there could be potential interference between the cells 115-3, 115-5, and 115-6.

Figure 4:
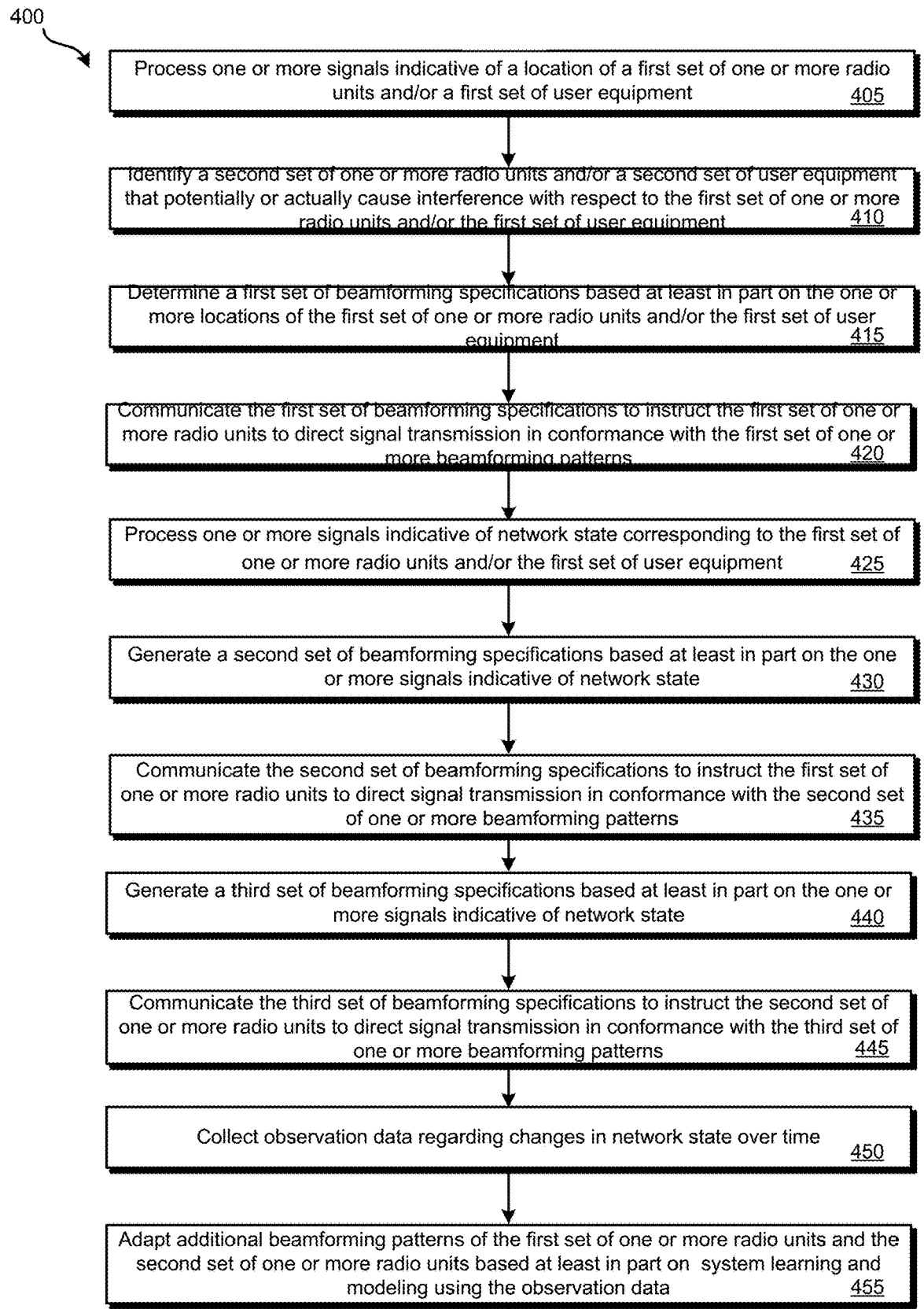
FIG. 4 illustrates an embodiment of a method for certain features directed to facilitating adaptive beamforming in a cellular network, in accordance with some example embodiments according to the present disclosure.

Various methods may be performed by the system 200. FIG. 4 illustrates an embodiment of a method 400 for certain features directed to facilitating adaptive beamforming in a cellular network, in accordance with some example embodiments according to the present disclosure. However, teachings of the present disclosure may be implemented in a variety of configurations. As such, the order of the steps comprising the method 200 and/or other methods, processes, and operations disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 405, the system 200 may process one or more signals indicative of one or more locations of a first set of one or more RUs 125 and/or a first set of one or more UEs 110. As indicated by block 410, the system 200 may identify a second set of one or more RUs 125 and/or a second set of UEs 110 that potentially or actually cause interference with respect to the first set of one or more RUs 125 and/or the first set of UEs 110. As indicated by block 415, the system 200 may determine a first set of beamforming specifications based at least in part on the one or more locations of the first set of one or more RUs 125 and/or the first set of one or more UEs 110 and/or the second set of one or more RUs 125 and/or the second set of UEs 110. The first set of beamforming specifications may correspond to a first set of one or more beamforming patterns. As disclosed further herein, the system 200 may take into account locations of the different sets of RUs 125 and UEs 110, as well as their current beamforming patterns, including directionalities and signal strengths thereof. As indicated by block 420, the system 200 may communicate the first set of beamforming specifications to instruct the first set of one or more RUs 125 to direct signal transmission in conformance with the first set of one or more beamforming pattern. The first set of beamforming specifications may be, for example, transmitted by way of other components 123 of the cellular network 120 such as one or more CUs 129 and DUs 127 to cause the RUs 125 to operate according to the first set of beamforming specifications to fully, substantially, or at least partially form the first set of one or more beamforming patterns.

Figure 6:
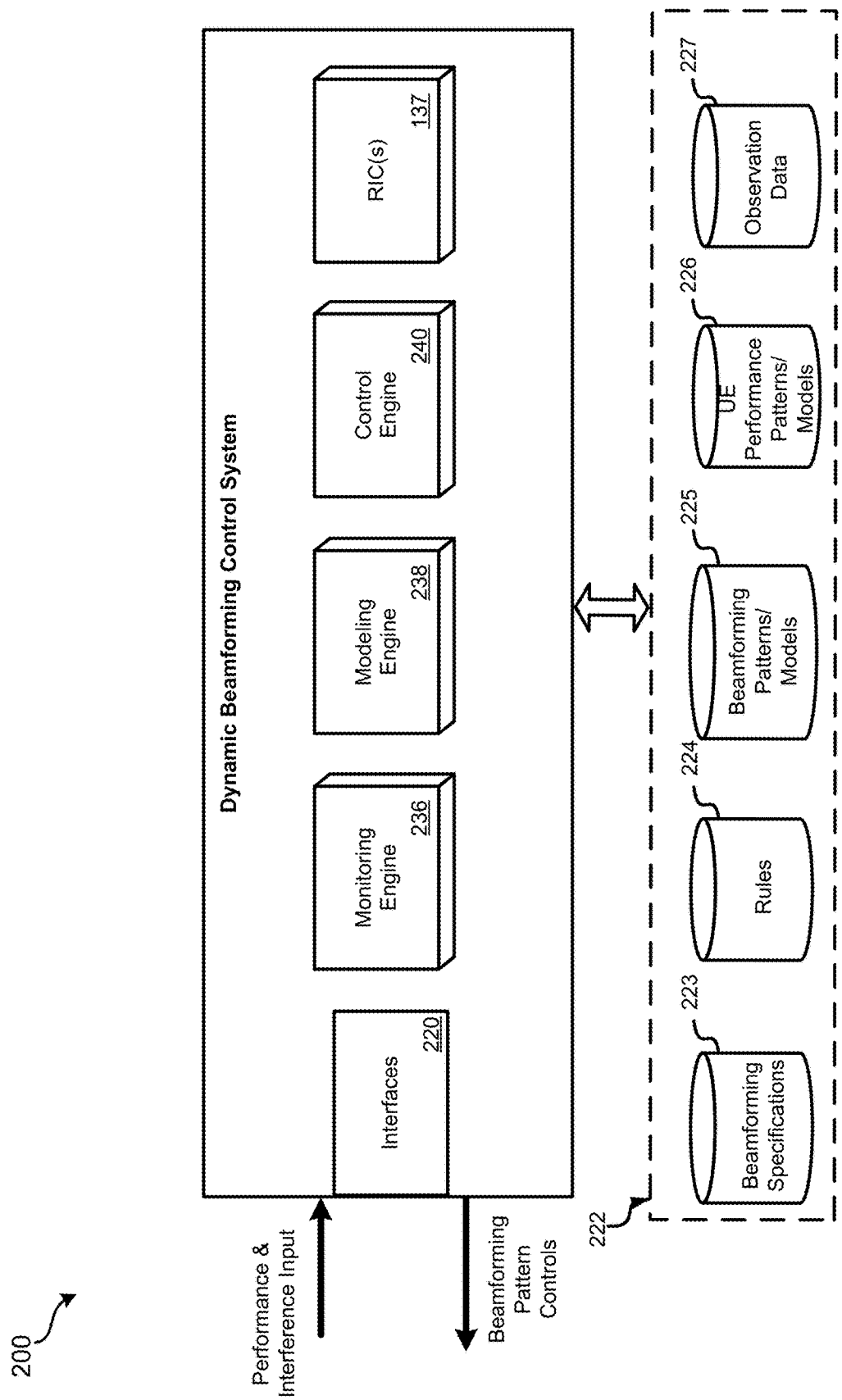
FIG. 6 illustrates the dynamic beamforming control system, in accordance with some example embodiments according to this disclosure.

Accordingly, for example, the system 200 may initially be preloaded with default beamforming specifications 223 for default beamforming patterns 225 (indicated with FIG. 6). The system 200 may initially select beamforming specifications 223 for one or more beamforming pattern 225 based at least in part on one or more location of one or more particular RUs 125 and/or UEs 110 (e.g., based at least in part on whether the cell 115 is located in a rural area, in a city, near a high-rise, on a high-rise, etc.), geopolitical area in which the one or more particular RUs 125 and/or UEs 110 are located, and/or the like. The initial selection of the beamforming specifications 223 for the one or more beamforming pattern 225 may be based at least in part on the system 200 determining mutually proximate cells 115, RUs 125, and UEs 110 based at least in part on the locations of the cells 115, RUs 125, and UEs 110 and the system 200 determining that there potential interference between the cells 115, RUs 125, and UEs 110.

Referring again to FIG. 4, as indicated by block 425, the system 200 may receive one or more signals indicative of network state corresponding to the first set of one or more RUs 125 and/or the first set of one or more UEs 110. As indicated by block 430, the system 200 may generate a second set of beamforming specifications based at least in part on the one or more signals indicative of network state, the second set of beamforming specifications corresponding to a second set of one or more beamforming patterns that is different from the first set of one or more beamforming patterns. As indicated by block 435, the system 200 may communicate the second set of beamforming specifications to instruct the first set of one or more RUs 125 to direct signal transmission in conformance with the second set of one or more beamforming patterns. As indicated by block 440, the system 200 may generate a third set of beamforming specifications based at least in part on the one or more signals indicative of network state, the third set of beamforming specifications corresponding to a third set of one or more beamforming patterns that is different from the first set of one or more beamforming patterns and the second set of one or more beamforming patterns. As indicated by block 445, the system 200 may communicate the third set of beamforming specifications to instruct the second set of one or more RUs 125 to direct signal transmission in conformance with the third set of one or more beamforming patterns. As indicated by block 450, the system 200 may collect observation data regarding changes in network state over time. For example, as disclosed herein, the system 200 may collect operational data (e.g., performance data, interference data, usage data, UE location data, signal strength data, and/or the like) over time, the operational data corresponding to observation data 227 observed by the system 200 about operations of the UEs 110. The system 200 may analyze the data to create or develop one or more models 225, 226. As indicated by block 455, the system 200 may adapt additional beamforming patterns of the first set of one or more RUs 125, the second set of one or more RUs 125, and other sets of one or more RUs 125 based at least in part on system learning and modeling using the observation data.

Accordingly, for example, the signals indicative of network state may correspond to actual network conditions. In various embodiments, this may include indications and data regarding network performance, UE 110 performance, interference levels experienced UE 110, UEs 110 newly accessing or no longer accessing the network, locations of UEs 110 (e.g., traveling away from one cell 115 and toward another cell 115), usage of the network, equipment operations and malfunctions, outside interference, and/or the like. The system 200 may pull or otherwise receive reports from each of the RUs 125. Each cell 115 may receive reports from its UE 110 regarding feedback, interference levels and instances, signal strength values, and/or the like. Such reports may be gathered by the system 200 through the RUs 125 and DUs 127. The system 200 may collect, parse, consolidate, and analyze information from the reports in order to determine potential and/or actual interference between the cells 115 in mutual proximity. UEs 110 may regularly send updates/reports and/or may be prompted to send updates with pull messages from the RUs 125. In some embodiments, the system 200 may prompt the UEs 110 via the RUs 125 to pull the updates/reports from the UEs 110. Instances of the messages from each of the UEs 110 may include one or a combination of an indication of location (e.g., latitude, longitude, other GPS coordinates, IP address, network address, account address, etc.) corresponding to the particular UE 110; an identifier of the user equipment (e.g., a MAC address, user account identifier, etc.); one or more values and/or other indications of the signal strengths of signals received by the UE 110; one or more values and/or other indications of interference experienced by the UE 110; one or more values and/or other indications of service loss experienced by the UE 110; one or more values and/or other indications of time, timestamps, dates, and/or durations corresponding to the signal strengths, interference, QOS parameters, and/or service loss; and/or the like.

The system 200 may be configured with one or more algorithms to check all beam patterns, signal strengths, locations, user distributions, and/or the like to determine optimal beam patterns for all the cells 115 that maximize signal strengths and minimize interferences between adjacent cells 115 and UEs 110 in real time and/or near real time. Subsequent to initially causing default beamforming patterns, the system 200 may change the beamforming patterns on the fly to optimize performance based at least in part on the feedback from UEs 110 communicating with the RUs/DUs. The system 200 update beamforming patterns frequently for each cell site 115, for example, responsive to receiving the performance data and/or in accordance with system-determined patterns and models for the particular sites 115.

Such adaptive beamforming pattern determinations may be done in real-time and could depend on the time of day (e.g., during the workday a high-rise may require a certain pattern, but after workday the RU 125 would have better performance with a different pattern). Accordingly, the system 200, using the modeling engine 238, may develop UE models 226 of required performance, actually experienced performance, interference experienced, and the like which may be associated with particular cells 115, RUs 125, and UEs 110, and collections thereof which may be mutual proximity. In some embodiments, beamforming pattern models 225 may be based at least in part on the UEs performance pattern models 226. The models 225, 226 made specify patterns that may be a function of time. The beamforming pattern models 225 may load-balance the demands placed upon mutually proximate cells 115, RUs 125, and UEs 110 in real-time and/or at a given time of day. Real-time adjustments may be made based at least in part on regular, continual, or other feedback from the cells 115, RUs 125, and UEs 110. The system 200 may use decision-making logic based at least in part on pattern detection and machine learning to determine if and/or when beamforming patterns are to be changed. Such adaptation, along with the other adaptive features of the system 200, may accelerate system responsiveness to address interferences and other changes.

The models may be regularly updated as the network changes to adapt to the changes in, for example, UEs 110 newly accessing or no longer accessing the network, locations of UEs 110, usage of the network, equipment operations and malfunctions, outside interference, and/or the like. In this manner, the system 200 may increase efficiency of allocation of resources as a function of the real-time updates of UEs 110, corresponding locations, usage, operations, interference, and/or time. In so doing, the system 200 may likewise minimize wastage of resources that only result in inefficiencies and interference.

The system 200 may generate beamforming specifications for each of the RUs 125. The beamforming specifications may specify any suitable manner particularized beamforming patterns, including specifications of signal strength and directionality, or each of the RUs 125. The beamforming specifications may constitute a system-orchestrated set of beamforming specifications that are particularized to mutually proximate RUs 125 and corresponding UEs 110 and that, when executed by the RUs 125, maximize strengths of signals directed to the UEs 110, while minimizing or eliminating interference between the signals directed to the LIB HO, The cells 115 and/or RUs 125 may include and/or be communicatively coupled to beam forming equipment, which may change electrical characteristics one or more antennas, such as a phased array, that is part of communication hardware of the cells 115 and/or RUs 125. A phased array may consist of a number of radiation elements whose phase and amplitude may be adjusted such that the superposition of the radiation pattern from the elements creates spot beams focused on specific user terminals. In various embodiments, adaptive beamforming schemes disclosed herein may be effected with analog beamforming, digital beamforming, and/or hybrid beamforming (e.g., analog and digital). Various embodiments according to the present disclosure may be applicable to all three beamforming implementation schemes. By various electrical characteristics of one or more antennas being changed, the radiation pattern may be altered. The resulting beams created by the one or more antennas may be directed with maximum or relatively higher signal strength in some directions while being minimized in other directions. In digital beamforming, the system may use a precoding matrix to control the phase and amplitude. Digital beamforming may be interpreted as an MIMO (multiple input multiple output) technology as both may use one or more precoding matrixes. By controlling the elements of the precoding matrix, multi-user MIMO may be implemented. One of example is massive MIMO. Various embodiments according to the present disclosure may be applicable to not only beamforming system, but also MIMO/

Multi-User MIMO systems. UE may report PMI/CQI/Rank based on the channel estimation from the UE. Using the UE feedback (PMI/CQI/Rank, etc.), various embodiments according to the present disclosure may optimize the beamforming and/or the MIMO transmission. Beamforming equipment may serve to alter the electrical characteristics of one or more pieces of communication hardware (e.g., antenna elements and its phase) to target areas and UEs 110, while limiting extent of interference caused to other areas and UEs 110. Using the beamforming specifications, the system 200 may instruct and control (e.g., via the one or more RICs 137, CUs 129, and/or DUs 127) the corresponding RUs 125 to operate to form beamforming patterns respectively specified by the system 200 for each of the RUs 125 in order to control overall interference with respect to UEs 110 serviced by the RUs 125. Judges may include beam steering data provided to beamforming equipment, which may change the electrical characteristics of the antennas perform beam in accordance with the beam steering data.

In various embodiments, instances of beam steering to control collections of cells 115 and RUs 125 in accordance with beamforming specifications (beam steering instructions) may be time-limited. This could account for and match transitory temporal UE patterns 226 learned by the system 200. Additionally, in some embodiments, when the system 200 is not determined previous pattern that matches current UE performance/interference updates, the system 200 may not immediately respond with changes to the beamforming patterns but may only do so after an additional buffer time period (e.g., of X seconds, minutes, hours) and/or after receiving one or more additional UE performance/interference updates that corroborate the previous update(s). For example, the system 200 may require updates to satisfy one or more time thresholds (e.g., multiple updates that corroborate one another over a time period of X seconds, minutes, etc.) and/or instance thresholds (e.g., a minimum number of corroborating updates) before beam steering cell sites 115 and/or RUs 125 with adjusted beamforming specifications for an adjusted beamforming pattern based at least in part on the updates. In some embodiments, additionally or alternatively, the system 200 may provisionally make such changes for a probational time period, while awaiting additional corroborating updates that meet one or more such additional thresholds. After the probational time period, if one or more additional updates do not corroborate the previously received updates, the system 200 may revert to the prior beamforming pattern specifications, instructing the sites 115 and/or RUs 125 accordingly.

The system 200 may determine one or more velocity metrics of one or more instances of detected interference. A velocity metric may correspond to a measure of how static or dynamic the interference propagation from one or more UEs 110 to one or more other UEs 110. When the system 200 determines (e.g., based at least in part on the velocity metric) that the interference is more static (e.g., satisfying a low-velocity threshold that is indicative of a static interference), the system 200 may require more time, corroborating updates, and/or higher thresholds before transitioning to different beamforming pattern controls. However, when the system 200 determines that the interference is more dynamic (e.g., based at least in part on the velocity metric), the system 200 may require less time, fewer corroborating updates, and/or lower thresholds before transitioning to different beamforming pattern controls. In some embodiments, when the paucity metric satisfies one or more thresholds, the system 200 may immediately transition to different beamforming pattern controls.

Figure 5:
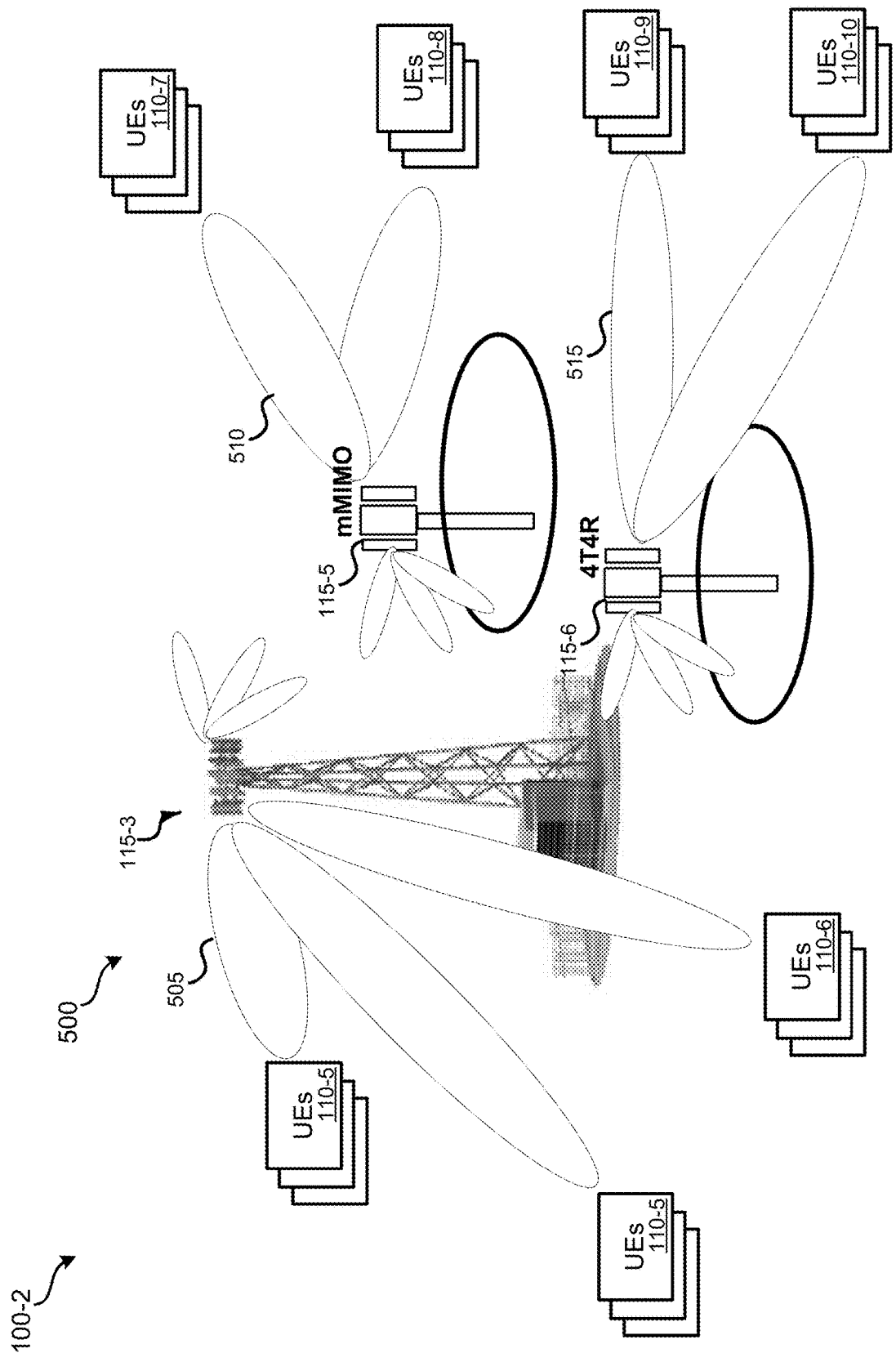
FIG. 5 illustrates a simplified example of a portion of the cellular network system where the system has controlled the beamforming of a subset of adjacent cells per the system-orchestrated set of beamforming specifications for the adjacent cells and the corresponding Lis, in accordance with some example embodiments according to the present disclosure.

FIG. 5 illustrates a simplified example of a portion of the cellular network system 100, where the system 200 has controlled the beamforming of a subset of adjacent cells 115 in accordance with the system-orchestrated set of beamforming specifications for the adjacent cells 115 and the corresponding UEs 110. The system 200 may have determined that the subset of cells 115-3, 115-5, and 115-6 are in mutual proximity that there could be potential interference between the mutually proximate cells 115-3, 115-5, and 115-6 and the UE 110 serviced by the cells 115-3, 115-5, and 115-6. The system 200 may have pulled or otherwise received reports from each of the RUs 125 corresponding to the cells 115-3, 115-5, and 115-6 (e.g., RU can report through DU by requesting RIC or control center). The system 200 may collect, consolidate, and analyze information from the reports in order to determine potential and/or actual interference between the cells 115-3, 115-5, and 115-6. The system 200 may have generated beamforming specifications for each of the RUs 125 corresponding to the cells 115-3, 115-5, and 115-6 that specify a system-orchestrated set of beamforming patterns 300.

The orchestrated set of beamforming patterns 500 may, for example, include a beamforming pattern 505 particularized to the macrocell 115-3. The beamforming pattern 505 may include directional beams that are directed and maximized in signal strength toward its UEs 110-4, 110-5, and 110-5. Other directional signals of the beamforming pattern 505 may be beam nulled and/or minimized in signal strength in the directions of the other cells 115-5 and 115-6 and/or the corresponding UEs 110-7, 110-8, 110-9, and 110-10 serviced by the cells 115-5 or 115-6. Likewise, orchestrated set of beamforming patterns 500 may include a beamforming pattern 510 particularized to the cell 115-5 and a beamforming pattern 315 particularized to the cell 115-6. The beamforming pattern 510 may include directional beams that are directed and maximized in signal strength toward its UEs 110-7 and 110-8, with other directional signals of beam nulled and/or minimized in signal strength in the directions of the other cells 115-3 and 115-6 and/or the corresponding UEs 110-4, 110-5, 110-6, 110-9, and 110-10. The beamforming pattern 515 may include directional beams that are directed and maximized in signal strength toward its UEs 110-9 and 110-10, with other directional signals of beam milled and/or minimized in signal strength in the directions of the other cells 115-3 and 115-5 and/or the corresponding UEs 110-4, 110-5, 110-6, 110-7, and 110-8.

FIG. 6 illustrates the dynamic beamforming control system 200, in accordance with some example embodiments according to this disclosure. For brevity, the dynamic beamforming control system 200 is depicted in a simplified and conceptual form, and may generally include more or fewer systems, devices, networks, and/or other components as desired. In various embodiments, the number and types of features or elements incorporated within the dynamic beamforming control system 200 may or may not be implementation-specific.

The system 200 may include special-purpose processors that are specifically designed, and physically and electrically configured, to perform the functions/operations detailed herein. The system 200 may include general-purpose processors may execute special-purpose software that is stored using one or more non-transitory, processor-readable mediums. The system 200 may interface with various systems and devices, including one or more client computing devices. In various embodiments, the system 200 may include a set of devices configured to process, transform, encode, translate, send, receive, retrieve, detect, generate, compute, organize, categorize, qualify, store, display, present, handle, or use information and/or data suitable for the embodiments described herein. For example, servers of the system 200 may be used to store software programs and data. Software implementing the systems and methods described herein may be stored on non-transitory storage media in the servers. Thus, the software may be run from the storage media in the servers. In some embodiments, software implementing the systems and methods described herein may be stored on storage media of other devices described herein. The system 200 may be implemented in or with a distributed computing and/or cloud computing environment with a plurality of servers and cloud-implemented resources by which services may be offered as cloud services. The system 200 may include processing resources communicatively coupled to storage media, random access memory (RAM), read-only memory (ROM), and/or other types of memory. The domain proxy control system 101 may include various input and output (I/O) devices, network ports, and display devices. Some embodiments of the domain proxy control system 101 may facilitate searching of one or more information repositories in response to data received over one or more networks (which may include the cellular network 120 and/or the Internet) from any one or combination of the interfaces.

In various embodiments, the system 200 may be composed of one or more specialized computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the system 200 may be adapted to run one or more services described herein. The system 200 may run an operating system, which may correspond to a server operating system. The system 200 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

The system 200 may include one or more system coordination servers. The system coordination servers may include any suitable type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. System coordination servers may include one or more server farms, clusters, or any other appropriate arrangement and/or combination or computer servers. System coordination servers may operate according to stored instructions located in a memory subsystem of the servers, and may run an operating system, including any suitable server operating system and/or any other operating systems discussed herein.

Data storage 222 of the system 200 may include one or more data storage servers, which may include file-based storage systems, block storage systems, and/or cloud object storage systems. Data storages may comprise stored data germane to the functions of the system 200. Illustrative examples of data storages that may be maintained in certain embodiments of the network are described below. In some embodiments, multiple data storages may reside on a single server, either using the same storage components of the server or using different physical storage components to assure data security and integrity between data storages. In other embodiments, each data storage may have a separate dedicated data storage server.

The system 200 may include one or more interfaces 220, that may include one or a combination of an on-prem interface, a CI/CD interface, a cloud interface, a data interface, a data center interface, a network controller phase, and operations interface, and/or the like configured to receive and/or transmit communications such as slice insecurity input and controls to facilitate various embodiments disclosed herein. In various embodiments, the interfaces 220 may be separated or a combination of interfaces 220 may be integrated. The system 200 may receive one or more source requests corresponding to a slice request and/or services from a client via one or more of the interfaces 220. Thus, one or more of the interfaces 220 may correspond to a client interface that may serve to receive requests from client devices.

The system 200 may include a monitoring engine 236, a modeling engine 238, and a control engine 240. The monitoring engine 236 and the modeling engine 238 may be configured to perform the monitoring features and modeling features disclosed herein. In various embodiments, the control engine 240 may communicate with and control the RIC(s) 137 to facilitate beamforming features disclosed herein. The control engine 240 may correspond to the orchestrator 138 in some embodiments. The control engine 240 may be configured to provide intelligence for the overall system 200. The control engine 240 may include one or more processing devices configured to intelligently orchestrate beamforming features of the network 100. For example, responsive to a detection of a UE performance/interference data update, the control engine 240 may trigger creation of beamforming specifications for orchestrated set of beamforming patterns particularized to plurality of cells 115 and UEs 110 and may provide a set of beamforming specifications 223 for beamforming patterns 225 for the plurality of cells 115 and corresponding RUs 125 in accordance with rules 224. The control engine 240 may identify the parameters for the beamforming patterns 225 and may issue instructions to create the instantiation of the beamforming patterns 225 by way of one or more RUs 125, the one or more DU slices 127, the CU slice 129, the components of the 5G core slice 139, and/or the like in accordance with the parameters.

A UE performance/interference data update may be detected. The system 200 may identify one or more signals corresponding to detection of a UE performance/interference data update mapped to one or more particular cells 115 and/or corresponding UEs 110. The system 200 may be configured to monitor for UE performance/interference data updates. In some embodiments, the system 200 may use the monitoring engine 236 configured to monitor the input/communications from RUs 125, DUs 127, CUs 129, other monitoring components, applications, and/or systems for any suitable aspects to facilitate improvements with features disclosed herein. The monitoring engine 236 may aggregate, process, and consolidate monitored input/communications to facilitate creation, development, and/or use of beamforming patterns and models 225, UE interference and interference profiles and patterns 226, observation data 227, and/or the like. In some embodiments, the system 200 may include or be otherwise communicatively coupled to one or more systems executing one or more applications that continuously monitor network performance to detect and capture any performance and interference data. Detection of the UE performance/interference data update may be based at least in part on system-recognition of signal strength values satisfying or not satisfying one or more thresholds, interference values satisfying or not satisfying one or more thresholds, losses of service continuity, operational patterns matching one or more vector patterns, and/or the like.

In various embodiments, the system 200 may use the modeling engine 238 configured to perform one or a combination of the matching, modeling, learning, reasoning, and/or the like analyses features disclosed herein. The modeling engine 238 may be an analysis and matching engine that employs machine learning to process the monitored input and/or observation data 227 disclosed herein (e.g., which may be received from the monitoring engine 236 in some embodiments), and/or data based at least in part thereon and develop the observation data 227, profiles, patterns, and/or models 225, 226. The modeling engine 236 may include or otherwise correspond to a learning engine that may employ an ongoing learning mode to create, update, confirm, correct, and/or refine the observation data 227, profiles, patterns, and/or models 225, 226. The modeling engine 236 may include a pattern-based reasoner that may be employed to use various statistical techniques in analyzing the data, both current and historical, in order to infer particularized pattern and/or model data (e.g., UE operational patterns, particularized interference patterns, compromised service patterns, and/or the like) from the data. A transitive reasoner may be employed to infer relationships from a set of relationships to form the particularized pattern and/or model data. In various embodiments, the system 200 may automatically establish and develop the particularized pattern data. In some embodiments, the modeling engine 236 may be configured to employ deep learning to process the data and derive the particularized pattern and/or model data.

In various embodiments, the system 200 may analyze operational data monitored and collected with respect to cells 115, RUs 125, and UEs 110 as ongoing security features prior to, during, and after UE performance/interference data updates to create or develop pattern and/or model data 225, 226. The models 225, 226 may be particularized to the particular cells 115, RUs 125, and UEs 110; cohorts of the cells 115, RUs 125, and UEs 110; performance and interferences; and/or the like and refined with further data collected and analyzed, as further disclosed herein.

The system 200 may store specifications for each of the cells 115, RUs 125, and UEs 110 in any suitable manner, including, for example, in profiles and/or models 225, 226 particularized to each cell 115, RU 125, and/or UE 110. In some instances, the system 200 may link, map, cross-reference, and/or otherwise associate profiles and/or models 225, 226 particularized to each cell 115, RU 125, and/or UE 110 with each other when the system 200 recognizes such elements being in mutual proximity, detection of being associated with the same UE performance/interference data update, recognition of instances where the cell 115, RU 125, and/or UE 110 operate in concert/cooperatively to effect an interference, and/or the like. The system 200 may store specifications for recognized cohorts of mutually proximate cells 115, RUs 125, and UEs 110 in any suitable manner, including, for example, in profiles and/or models 225, 226 particularized to the cohorts of cells 115, RUs 125, and UEs 110.

Figure 7:
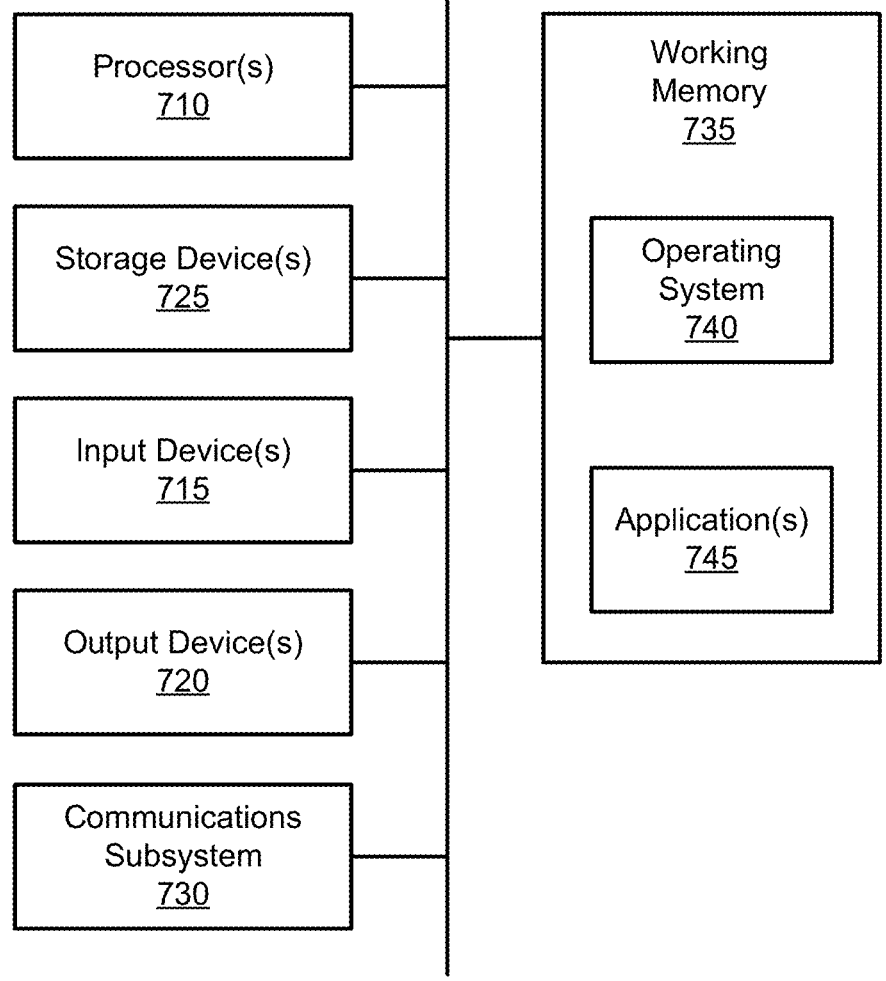
FIG. 7 illustrates a computer system, in accordance with some example embodiments according to this disclosure.

A computer system as illustrated in FIG. 7 may be incorporated as part of the previously described computerized devices. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data storages, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "machine-readable media," "computer-readable storage medium," "computer-readable storage media," "computer-readable medium," "computer-readable media," "processor-readable medium," "processor-readable media," and/or like terms as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations may provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A system to facilitate adaptive beamforming in a cellular network, the system comprising:
   one or more processing devices; and
   memory communicatively coupled with and readable by the one or more processing devices and having stored therein machine-readable instructions which, when executed by the one or more processing devices, cause the one or more processing devices to perform operations comprising:
      prompting a first set of user equipment to communicate one or more signals indicative of a network state to a first set of one or more radio units, wherein the one or more signals indicative of the network state indicate one or more of: network and/or user equipment performance; interference experienced by the first set of user equipment; changes in network access by the first set of user equipment; network usage by the first set of user equipment; or travel of the first set of user equipment away from one cellular site and toward another cellular site;
      determining a first set of beamforming specifications based at least in part on the one or more signals indicative of the network state from the first set of user equipment, the first set of beamforming specifications corresponding to a first set of one or more beamforming patterns; and
      communicating the first set of beamforming specifications to instruct the first set of one or more radio units to direct signal transmission in conformance with one or more directionalities and one or more signal strengths corresponding to the first set of one or more beamforming patterns.

2. The system to facilitate adaptive beamforming in a cellular network as recited in claim 1, wherein the one or more signals indicative of the network state indicate changes in network access by the first set of user equipment, and the operations further comprising:
   developing one or more models based at least in part on the one or more signals of the network state, wherein the first set of beamforming specifications are determined based at least in part on the one or more models;
   identifying a second set of one or more radio units and/or a second set of user equipment that potentially or actually cause interference with respect to the first set of one or more radio units and/or the first set of user equipment;
   where the determining the first set of beamforming specifications is based at least in part on the second set of one or more radio units and/or the second set of user equipment.

3. The system to facilitate adaptive beamforming in a cellular network as recited in claim 1, wherein the one or more signals indicative of the network state indicate network performance, and the operations further comprise:
   generating a second set of beamforming specifications based at least in part on the one or more signals indicative of network state, the second set of beamforming specifications corresponding to a second set of one or more beamforming patterns that is different from the first set of one or more beamforming patterns; and
   communicating the second set of beamforming specifications to instruct a first set of one or more radio units to direct signal transmission in conformance with the second set of one or more beamforming patterns.

4. The system to facilitate adaptive beamforming in a cellular network as recited in claim 3, wherein the one or more signals indicative of the network state further indicate user equipment performance, and the operations further comprise:
   generating a third set of beamforming specifications based at least in part on the one or more signals indicative of network state, the third set of beamforming specifications corresponding to a third set of one or more beamforming patterns that is different from the first set of one or more beamforming patterns and the second set of one or more beamforming patterns; and
   communicating the third set of beamforming specifications to instruct the second set of one or more radio units to direct signal transmission in conformance with the third set of one or more beamforming patterns.

5. The system to facilitate adaptive beamforming in a cellular network as recited in claim 1, wherein the one or more signals indicative of network state indicate interference experienced by the first set of user equipment.

6. The system to facilitate adaptive beamforming in a cellular network as recited in claim 1, wherein the one or more signals indicative of the network state indicate network usage by the first set of user equipment.

7. The system to facilitate adaptive beamforming in a cellular network as recited in claim 1, wherein the one or more signals indicative of the network state indicate travel of the first set of user equipment away from one cellular site and toward another cellular site.

8. A method to facilitate adaptive beamforming in a cellular network, the method comprising:
   prompting, by a beamforming control system, a first set of user equipment to communicate one or more signals indicative of a network state to a first set of one or more radio units, wherein the one or more signals indicative of the network state indicate one or more of: network and/or user equipment performance; interference experienced by the first set of user equipment; changes in network access by the first set of user equipment; network usage by the first set of user equipment; or travel of the first set of user equipment away from one cellular site and toward another cellular site;
   determining, by the beamforming control system, a first set of beamforming specifications based at least in part on the one or more signals indicative of the network state from the first set of user equipment, the first set of beamforming specifications corresponding to a first set of one or more beamforming patterns; and
   communicating, by the beamforming control system, the first set of beamforming specifications to instruct the first set of one or more radio units to direct signal transmission in conformance with one or more directionalities and one or more signal strengths corresponding to the first set of one or more beamforming patterns.

9. The method to facilitate adaptive beamforming in a cellular network as recited in claim 8, the method comprising:
   identifying, by the beamforming control system, a second set of one or more radio units and/or a second set of user equipment that potentially or actually cause interference with respect to the first set of one or more radio units and/or the first set of user equipment;
   where the determining the first set of beamforming specifications is based at least in part on the second set of one or more radio units and/or the second set of user equipment.

10. The method to facilitate adaptive beamforming in a cellular network as recited in claim 9, the method comprising:
- receiving, by the beamforming control system, one or more signals indicative of network state corresponding to the first set of one or more radio units and/or the first set of user equipment;
- generating, by the beamforming control system, a second set of beamforming specifications based at least in part on the one or more signals indicative of network state, the second set of beamforming specifications corresponding to a second set of one or more beamforming patterns that is different from the first set of one or more beamforming patterns; and
- communicating, by the beamforming control system, the second set of beamforming specifications to instruct the first set of one or more radio units to direct signal transmission in conformance with the second set of one or more beamforming patterns.

11. The method to facilitate adaptive beamforming in a cellular network as recited in claim 10, the method comprising:
- generating, by the beamforming control system, a third set of beamforming specifications based at least in part on the one or more signals indicative of network state, the third set of beamforming specifications corresponding to a third set of one or more beamforming patterns that is different from the first set of one or more beamforming patterns and the second set of one or more beamforming patterns; and
- communicating, by the beamforming control system, the third set of beamforming specifications to instruct the second set of one or more radio units to direct signal transmission in conformance with the third set of one or more beamforming patterns.

12. The method to facilitate adaptive beamforming in a cellular network as recited in claim 11, wherein the one or more signals indicative of network state indicate interference with respect to the first set of user equipment and/or the second set of user equipment.

13. The method to facilitate adaptive beamforming in a cellular network as recited in claim 12, wherein the beamforming control system uses one or more radio access network intelligent controllers to control the first set of one or more radio units to transition from operating in conformance with the first set of one or more beamforming patterns to operating in conformance with the second set of one or more beamforming patterns.

14. The method to facilitate adaptive beamforming in a cellular network as recited in claim 13, wherein the beamforming control system uses one or more radio access network intelligent controllers to control the second set of one or more radio units to transition from operating in conformance with the third set of one or more beamforming patterns to operating in conformance with a fourth set of one or more beamforming patterns.

15. One or more non-transitory, machine-readable media having machine-readable instructions thereon which, when executed by one or more processing devices, cause the one or more processing devices to perform operations comprising:
- prompting a first set of user equipment to communicate one or more signals indicative of a network state to a first set of one or more radio units, wherein the one or more signals indicative of the network state indicate one or more of: network and/or user equipment performance; interference experienced by the first set of user equipment; changes in network access by the first set of user equipment; network usage by the first set of user equipment; or travel of the first set of user equipment away from one cellular site and toward another cellular site;
- determining a first set of beamforming specifications based at least in part on the one or more signals indicative of the network state from the first set of user equipment, the first set of beamforming specifications corresponding to a first set of one or more beamforming patterns; and
- communicating the first set of beamforming specifications to instruct the first set of one or more radio units to direct signal transmission in conformance with one or more directionalities and one or more signal strengths corresponding to the first set of one or more beamforming patterns.

16. The one or more non-transitory, machine-readable media as recited in claim 15, the operations further comprising:
- identifying a second set of one or more radio units and/or a second set of user equipment that potentially or actually cause interference with respect to the first set of one or more radio units and/or the first set of user equipment;
- where the determining the first set of beamforming specifications is based at least in part on the second set of one or more radio units and/or the second set of user equipment.

17. The one or more non-transitory, machine-readable media as recited in claim 16, the operations further comprising:
- receiving one or more signals indicative of network state corresponding to the first set of one or more radio units and/or the first set of user equipment;
- generating a second set of beamforming specifications based at least in part on the one or more signals indicative of network state, the second set of beamforming specifications corresponding to a second set of one or more beamforming patterns that is different from the first set of one or more beamforming patterns; and
- communicating the second set of beamforming specifications to instruct the first set of one or more radio units to direct signal transmission in conformance with the second set of one or more beamforming patterns.

18. The one or more non-transitory, machine-readable media as recited in claim 17, the operations further comprising:
- generating a third set of beamforming specifications based at least in part on the one or more signals indicative of network state, the third set of beamforming specifications corresponding to a third set of one or more beamforming patterns that is different from the first set of one or more beamforming patterns and the second set of one or more beamforming patterns; and
- communicating the third set of beamforming specifications to instruct the second set of one or more radio units to direct signal transmission in conformance with the third set of one or more beamforming patterns.

19. The one or more non-transitory, machine-readable media as recited in claim 18, wherein the one or more signals indicative of network state indicate interference with respect to the first set of user equipment and/or the second set of user equipment.

20. The one or more non-transitory, machine-readable media as recited in claim 19, wherein one or more radio access network intelligent controllers are used to control the first set of one or more radio units to transition from operating in conformance with the first set of one or more beamforming patterns to operating in conformance with the second set of one or more beamforming patterns.

* * * * *